United States Patent
De Lizasoain

[15] 3,667,234
[45] June 6, 1972

[54] REDUCING AND RETARDING VOLUME AND VELOCITY OF A LIQUID FREE-FLOWING IN ONE DIRECTION

[72] Inventor: Gabriel V. De Lizasoain, Boca Raton, Fla.
[73] Assignee: Tecnico, Inc., Washington, D.C.
[22] Filed: Feb. 10, 1970
[21] Appl. No.: 10,205

[52] U.S. Cl. ....................................................61/1 R, 61/2
[51] Int. Cl. ................................................................E02b 3/00
[58] Field of Search ..............................61/1 R, 2, 3, 4, 5, 6; 137/81.5

[56] References Cited

UNITED STATES PATENTS 1,329,559  2/1920  Tesla................................137/81.5 X
1,375,232  4/1921  Rush............................................61/4
1,575,362  3/1926  Haupt...........................................61/4

Primary Examiner—David J. Williamowsky
Assistant Examiner—David H. Corbine
Attorney—Townshend & Meserole

[57] ABSTRACT

The volume and velocity of a free flowing body of water, such as a river or the like, moving in one direction past a control point are there reduced and retarded by diverting part of the volume of water, amplifying its velocity, linearizing its flow characteristics, and directing this modified flow back into the main body of liquid at such an angle as to create in the body of the stream, at the control point area, a zone of compound flows which through turbulence, drag, and other fluid phenomena materially obstruct and retard the flow through the control area.

4 Claims, 1 Drawing Figure

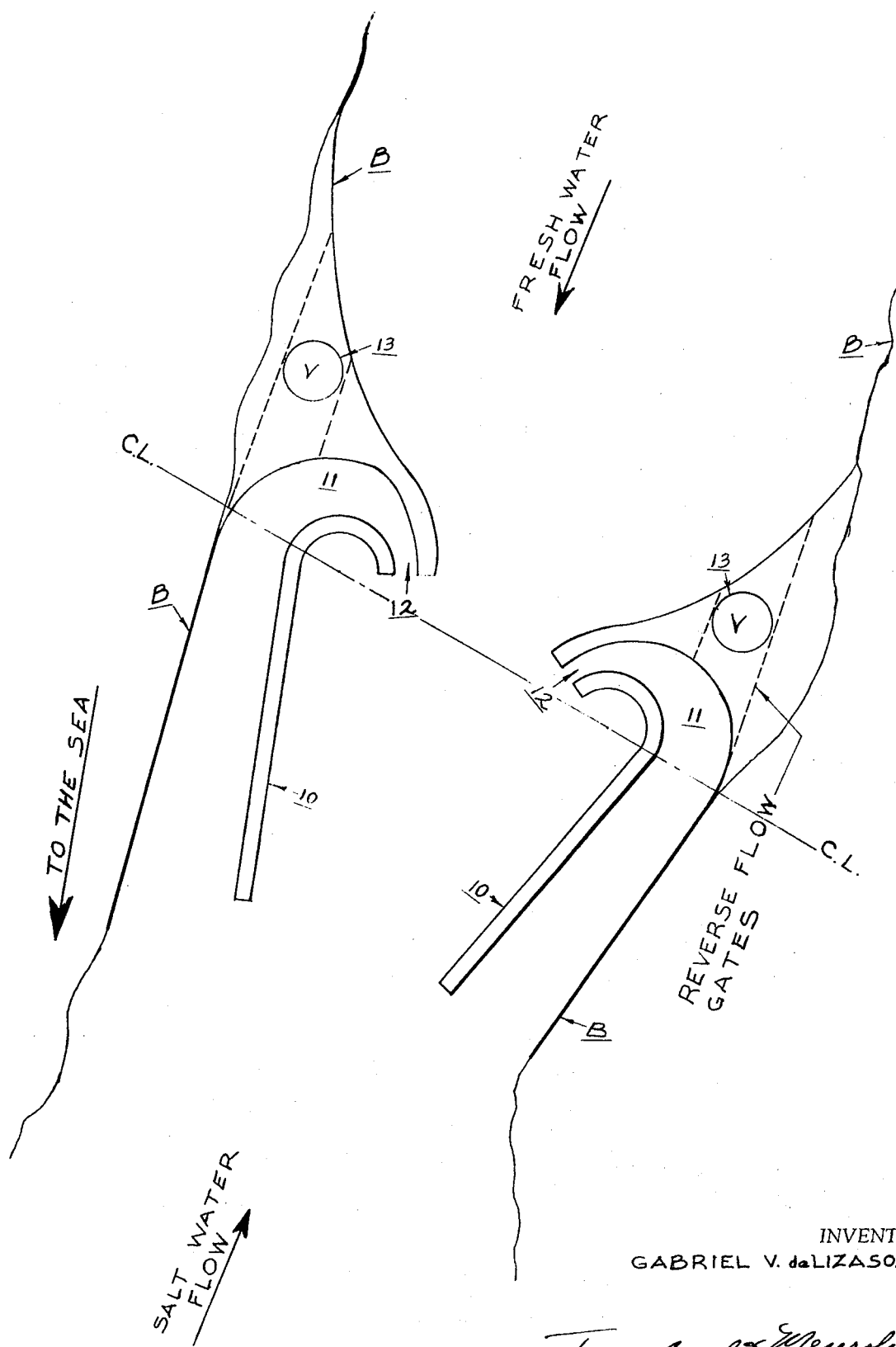

3,667,234

REDUCING AND RETARDING VOLUME AND VELOCITY OF A LIQUID FREE-FLOWING IN ONE DIRECTION

BACKGROUND

1. Field of the Invention

The present invention relates in general to the art of fluidic engineering, and in particular to the field of control methods and systems for reducing and minimizing high tide surges of ocean water into fresh water outlets that connect to the sea, and flood surge flow in rivers.

The problem of preventing contamination of wells by seepage of ocean water is a matter of serious concern to municipalities and communities which contain or border upon fresh water outlets that are subject to salt water tidal flow for long distances inland. This is particularly true along the eastern seaboard of Florida, where numerous rivers, streams, canals and other fresh water tributaries open at their mouths to the intracoastal waterway. This waterway is supplied also with ocean water through inlets spaced several miles apart along the coast. Passage of small craft through these ocean inlets is vital to the economy of the state; so they must be maintained in a condition permitting easy passage of such craft at all times. In consequence, they remain open to the tidal influx of salt water from the ocean under such pressure and in so great a volume that it is forced upstream through the mouths of the fresh water outlets which empty into the waterway; reaching far inland at high tide and seeping into wells in the vicinity.

No example is needed to demonstrate the damage caused by flood surges in rivers. It is too well known for comment.

2. The Prior Art

So far as I am aware, the prior art teaches no solution of the problem other than the erection of dams with tops above the level of high tide or flood stage. Although these are effective to prevent upstream flow of salt water and flood conditions, except in special cases wherein complete lock systems are provided, they make no provisions for unimpeded passage of vessels and therefore cannot be used at the locations where freedom of passage of such vessels is an absolute essential. Unobstructed navigation is also a paramount necessity for rivers.

SUMMARY OF THE INVENTION

The present invention is primarily a method and system for retarding the intrusion of salt water into fresh water outlets that are subject to salt water tidal flow. Its primary object is to so retard the inflowing high tide surges of salt water that, before it can move far enough upstream in a fresh water outlet to contaminate wells in the vicinity, the tide will have turned and the salt water will have reversed its flow.

Retardation of the salt water is accomplished in the method of this invention by creating areas of major turbulence such as vortices, cross-currents, counter flow currents and the like, generated by the inflowing salt water itself, at one or more established control lines in the fresh water outlet, and which constitute liquid barriers opposing the inward passage of the salt water but permitting unobstructed outflow thereof. At the control line, part of the volume of the inflowing salt water is diverted into secondary channels wherein its flow is increased in velocity and linearized in direction so that it may be caused to flow back into the remainder of the stream at an angle of incidence such that it will cause turbulence drag and other fluid phenomena which will, in turn, act in opposition to the flow of the stream thereby reducing its velocity and considerably slowing its upstream travel while the tide is rising to its peak. In effect, the resistance imparted by the incident flow is increased by fluidic amplification thereof.

Basically, the system described herein materially reduces the area of unrestricted passage to dimensions commensurable with practical utilization (possibly limited to the natural navigable channel). The flow outside of the navigable portion of the channel is then linearized and to an extent recurved to one or more tapering passages which channel the flow and utilize the remaining kinetic energy (after loss through drag, friction, and linear vector change) to feed it back as a modifying factor to the free flowing portion of the channel. This results in, (a) dissipation of the velocity vector (kinetic energy) of the free flowing portion, and (b) through molecular collision and drag, an increase in pressure gradient the length of the containment device with a resulting rise in height in the unopposed vertical vector and plane of contact with the atmosphere. This high drag and pressure area, and the turbulence created, act along the constriction of the system to result in a combination mechanical and high pressure fluid barrier which proportionately limits the flow of liquid through the barrier.

When the invention is used to reduce and retard flood surges in rivers and the like, a major volume of the flood surge is diverted, channeled, and directed against the main flow in the manner hereinbefore described in connection with salt water intrusion.

The barriers described as subject of the invention, in addition to the proportionate retention characteristics, will — in the manner of true fluid amplifiers — have a certain periodicity or low frequency oscillation as an inherent characteristic.

Since the retardant effect is proportional to the flow velocities and volume, the action of the barrier will tend, as intended, to retard the over all flow of the stream in a descending curve of efficiency. This reduction in efficiency will conversely result in a subsequent increase in flow velocities which will again, in turn, result in an ascending efficiency curve. As can be readily seen from the above, the device will thereby oscillate in intensity and relative efficiency so that the flow can only be calculated volumetrically as an average of this oscillatory motion. A simpler way to calculate the efficiency of the device will be the halving of the difference between the minimum efficiency node and the peak efficiency surge.

The oscillatory character of the device further enhances its inherent flow retardance characteristics since its peak efficiency is coupled to flow surges which provide a better reactive pattern due to the characteristics inherent in the design of such fluid devices.

In addition to the preceding, and especially in the case of fluvial flows, the oscillatory character of the retardant barrier can be enhanced by the utilization of a plurality of such containment devices spaced along the course of the river in such a manner that the distance between the devices is 180° off phase from an exact multiple of the wave length or oscillation from each individual barrier.

DESCRIPTION OF THE DRAWING

The drawing is a plan view of an example of a system constituting the most easily visualized configuration thus far contemplated by me for practicing the method of this invention. However, actual design can result in a wide variety of configurations each tailored to specific conditions.

DESCRIPTION OF PREFERRED EMBODIMENT

In the simplest form embodiment of the invention as illustrated in the drawing, a control line CL is established across a free-flowing fresh water outlet stream between its banks B at or near its mouth, by barriers operative to bar upstream passage of a major volume of salt water inflowing on a rising tide.

As here shown, the barriers comprise, along each bank, a fixed wall 10 of reinforced concrete, interlocking metal piles, or other suitable structure disposed for the major portion of its length at an angle divergent downstream from the adjacent bank; so that the downstream ends of the barriers 10 converge towards mid-stream but are spaced apart a distance sufficient to provide ample clearance for a vessel to pass therebetween.

The barriers 10 together with their adjacent banks B constitute channels which narrow at their upstream ends into further narrowing throats 11 that are curved inwardly towards mid-stream and which terminate in jet nozzles 12 that open into the main body of the fresh water stream at an angle of between 90° and 180° in a direction such that they cause an opposing effect to the inflowing salt water which surges through the vessel passage between the outer ends of the barriers.

The throat 11 of each barrier is by-passed adjacent the bottom of the barrier by a reverse flow conduit (shown in dotted line) controlled by a valve 13, thus providing a reverse flow gate. Each valve 13 is a conventional one-way automatic flow valve which permits rapid unimpeded flow in the seaward or downstream direction and serves to flush the system during outgoing tide flow.

The barriers 10 in conjunction with their adjacent banks are modifying features which channel a portion of the fluid, linearizing its flow pattern and increasing its velocity so that it may be used as a control factor to create, within the body of the barrier, a condition retardant to the flow. In this manner it can be said that by reason of its design the device operates in a manner as to amplify the effective force of the canalized liquid used as a control factor.

BEST MODE OF OPERATION

The best mode of operation presently contemplated by me is as follows:

At a selected control point, a control line is established by projection transversely across and between the banks of a free-flowing body of water, such as a river, creek, brook or the like. At such line, one or more dam-like barriers are constructed and positioned so that they obstruct surge (either flood or tidal) passage of water in a direction in which it is intended that the power and thrust of the surge be retarded and minimized to the greatest possible extent without preventing uninterrupted passage of vessels in either direction past the control point. The barriers are so disposed that (upstream relative to the direction of flow to be controlled) they divert at least a substantial volume of the flow to be controlled into confined channels in which the flow of the confined water is linearized and turned in such direction that it is discharged into the main stream as jets opposing its flow at some angle between 90° and 180° upstream thereof.

In either case, the jets discharging into the main stream serve by momentum interchange to create an area of violent turbulence, such as cross-currents, vortices, etc., at and across the vessel passage through the barrier; thereby providing at that location a liquid barrier obstructing passage of the flow surge to be controlled. This liquid barrier bridges the vessel passage opening in the solid dam-like barrier and, together with the solid barrier, effectively obstructs and materially retards flow of water past the control line in the direction in which the volume of surge flow is to be reduced and retarded.

In the embodiment of the system as shown in the drawing, the dam-like barriers 10 extend downstream of a fresh water outlet that is subject to salt water tidal flow from the ocean, and the surge flow to be controlled is the incoming high tide salt water which flows upstream in the outlet until the tide turns, but which, relative to the direction of surge flow is downstream.

In river flood damage control use, the direction of flood surge flow is also downstream; so that the drawing is equally illustrative simply by regarding the illustrated stream as a river flowing in the direction indicated as "salt water flow" in the drawing. The method of operation is the same as that hereinbefore described for salt water intrusion control. The solid barriers 10 in conjunction with the river banks provide hydraulic amplifier channels that divert a substantial volume of the river water and redirect it to flow against and into direct opposition to the flow of the main body, thereby materially slowing down and dissipating the destructive force of a flood surge.

In all embodiments of the invention, the jet nozzles 12 are so directed relative to the longitudinal axis of flow of the main body of the liquid passing the control point that the streams tending to issue therefrom interact by momentum interchange with the main body of the liquid, causing boundary layer drag which deflects the main body of the liquid into a combination of vortices, cross currents, counter currents and other turbulence in the area between the walls 10 and extending entirely across the navigation opening between the nozzles 12. In this respect, the turbulence area between the walls 10 may be likened to the interaction zone of a conventional pure fluid amplifier, because the level of water backing up in the side channels rises to create a vertical head that, by its weight, amplifies the velocity of the streams issuing from the nozzles 12. The magnitude of the force exerted by this head is a function of the height of the confinement area between each wall 10 and its adjacent stream bank B.

I claim:

1. The method of reducing the quantitative volume and linear volocity of a stream of liquid free-flowing in one direction through an open main channel defined by side walls past a control point located therein, which comprises: diverting at the control point a portion of the main body of the liquid and directing the diverted portion to flow into an open side channel and back into the main body of the liquid in such direction relative to the normal longitudinal axis of flow of the main body of the liquid that the diverted portion creates in the main body turbulence, vortices, and counter-currents exerting forces which impede passage of the main body of the free-flowing liquid through the main channel past the control point.

2. The method of retarding influx of sea water within a main channel of a laterally confined fresh water stream outlet subject to tidal flow, which comprises: diverting a portion of the sea water incoming on a rising tide to flow upstream through at least one side channel which has an outlet smaller in cross section area than the inlet cross section area of the main channel; directing the sea water flowing in the side channel to discharge into the sea water flowing in the main channel at such an angle to the longitudinal axis of the main channel flow that the discharge from the side channel creates in the main channel turbulences, vortices, and counter-currents which effects diminution of the velocity of sea water flowing in the main channel in a direction upstream of the fresh water outlet.

3. The method of abating flood surge in a river, which comprises: selecting a control point between the river banks; diverting at the control point a portion of the water of a surge head passing said point; and directing said diverted portion of water through a channel to flow back into the undiverted portion of water in a direction such that the diverted portion exerts an opposing force against the surge head of a magnitude sufficient to create turbulence, vortices, and countercurrents to retard its passage past the control point.

4. A system for retarding and minimizing tidal sea water intrusion into a laterally confined fresh water stream outlet connected to the sea, comprising: barrier means dividing the fresh water stream outlet into a main channel and at least one side channel; said barrier means diverting and directing a portion of the total volume of intruding sea water in the main channel to flow through the side channel and back into the main channel in a direction effecting opposition to the flow of the undiverted sea water into the stream outlet; the cross section area of said side channel decreasing from the downstream end to the upstream end thereof so as to amplify the velocity of the diverted portion of intruding sea water.

* * * * *